United States Patent [19]
Lujano et al.

[11] Patent Number: 5,902,564
[45] Date of Patent: *May 11, 1999

[54] MATERIAL WITH MICROPOROUS CRYSTALLINE WALLS DEFINING A NARROW SIZE DISTRIBUTION OF MESOPORES, AND PROCESS FOR PREPARING SAME

[75] Inventors: Juan Lujano, Caracas; Yilda Romero, Edo. Aragua; Jose Carrazza, San Antonio de los Altos, all of Venezuela

[73] Assignee: Intevep, S.A., Caracas, Venezuela

[ * ] Notice: This patent is subject to a terminal disclaimer.

[21] Appl. No.: 09/178,678

[22] Filed: Oct. 26, 1998

Related U.S. Application Data

[63] Continuation of application No. 08/659,645, Jun. 6, 1996, Pat. No. 5,849,258.

[51] Int. Cl.$^6$ ............................ C01B 39/04; C01B 39/22; C01B 39/24
[52] U.S. Cl. ........................... 423/702; 423/705; 423/709; 423/DIG. 21
[58] Field of Search ........................ 423/700, 701, 423/702, 704, 705, 713, DIG. 14, DIG. 21, 709; 502/60, 62, 63, 64, 65, 66, 68, 73, 74, 79

[56] References Cited

FOREIGN PATENT DOCUMENTS 0206871  12/1986  European Pat. Off. .
89190490  11/1987  Japan .

*Primary Examiner*—Mark L. Bell
*Assistant Examiner*—David Sample
*Attorney, Agent, or Firm*—Bachman & LaPointe, P.C.

[57] ABSTRACT

The invention relates to a synthetic crystalline material and its use in catalytic conversion of organic compounds and as a sorbent. The crystalline material contains one or more microporous crystalline phases, having a micropore volume greater than or equal to about 0.15 cc/g distributed in channels between about 3 to about 15 Å in average diameter which is rendered accessible by a mesopore volume of greater than or equal to about 0.1 cc/g distributed in channels between about 20 to about 100 Å in average diameter. A process is also provided for preparing the crystalline material of the present invention.

11 Claims, 4 Drawing Sheets

MATERIAL WITH MICROPOROUS CRYSTALLINE WALLS DEFINING A NARROW SIZE DISTRIBUTION OF MESOPORES, AND PROCESS FOR PREPARING SAME

This is a Continuation of application Ser. No. 08/659,645, filed Jun. 6, 1996 now U.S. Pat. No. 5,849,258.

BACKGROUND OF THE INVENTION

The invention relates to a synthetic material which is particularly useful for processing feedstock having large organic molecules, either as a catalyst or as a sorbent.

The processing of large organic molecule-containing feedstocks such as heavy hydrocarbons, fine chemicals, pharmaceutical products and the like involving catalysts or adsorbents is typically inefficient and expensive due to the lack of catalyst materials with appropriate qualities. A significant limitation on conventionally known active agents is the lack of sufficient pores of appropriate size in the catalyst or adsorbent to carry out the desired process.

Typically, heavy hydrocarbons are processed using amorphous materials having pore volumes lower than 0.1 cc/g, which pore volume is distributed over a wide range of pore diameters, typically ranging between 20 to 1,000 angstrom (Å) in diameter. Due to the large range and high upper end of the pore diameter of this material, the pore volume is lower than would be desirable. Furthermore, these materials possess low-activity sites where activity is defined in terms of number of molecules converted per unit of time, thereby limiting their effectiveness as promoters in conversion to desirable products.

Due to the foregoing limitations, heavy hydrocarbons are occasionally processed using zeolite catalysts which are not ideal due to the pore diameter formed in crystalline microporous aluminosilicates such as zeolite. Because of the small pore diameter, only active sites on the particle exterior of the zeolite are useful for processing such heavy hydrocarbons. This results in the use of large quantities of the zeolite, thereby significantly increasing the catalyst cost involved with the process, and decreasing the profitability of same.

Attempts have been made to improve the accessibility to large hydrocarbons of the active sites in a zeolite material. One method which has been industrially applied has been the dealumination of the material, for example by steam or contact with $SiCl_4$. By extracting aluminum from the zeolite framework, a portion of the crystal structure collapses giving rise to holes ranging in diameter from 10 Å to 1,000 Å. Although this procedure does provide some degree of larger pore volume in zeolites, several disadvantages are inherent. First, several post-synthesis steps are required, which result in the waste of a portion of the original starting zeolite material, thereby making the synthesis process more complicated and expensive. In addition, amorphous alumina particles resulting from the extraction process are left on the surface on the mesoporous channels, hindering or even blocking the diffusion of reactants and products. Further, this procedure does not selectively generate pores of a particular desired size. Rather, a random distribution of large pores are generated, most of which are larger than 100 Å in diameter. Because of this, dealuminated zeolites have limited use in catalytic processes that, based on size exclusion principles, must essentially yield a desired large organic product.

Available sorbents for separation of large molecules from feedstocks also have important technological limitations. They are constituted by amorphous materials, with low density of sorption sites.

It is clear, therefore, that the need remains for an improved material, for use either as a catalyst or as a sorbent, in processing, converting and/or purifying feedstocks having large organic molecules such as heavy hydrocarbons and the like.

It is therefore the primary object of the present invention to provide a synthetic material having microporous crystalline walls, accessible through a high volume of mesoporous channels of desired and controlled pore diameter sizes and distributions.

It is a further object of the present invention to provide a process for preparing the material of the present invention wherein the material has microporous crystalline walls having micropore sized pore volume and is provided with a high mesopore sized pore volume in a narrow pore size distribution.

It is still another object of the present invention to provide a process for treating a feedstock having large organic molecules with the material of the present invention used as a catalyst so as to provide conversion and transformation of the feedstock into more valuable products, at high rates of conversion, and with high selectivity.

It is still another object of the present invention to provide a process for purification of a mixture of organic compounds so as to selectively remove one or more components from this mixture by adsorption onto the material of the present invention.

Other objects and advantages of the present invention will appear hereinbelow.

SUMMARY OF THE INVENTION

In accordance with the invention, the foregoing objects and advantages are readily attained.

According to the invention, a material is provided for processing feedstocks including large organic molecules either as a catalyst or as a sorbent. The material comprises a crystalline material having at least one microporous crystalline phase having a micropore volume of at least about 0.15 cc/g distributed in channels between about 3 to about 15 Å in average diameter, and having a mesopore volume of at least about 0.1 cc/g distributed in channels between about 20 to about 100 Å in average diameter, whereby said mesopore volume renders said micropore volume accessible.

In further accordance with the invention, a process is provided for preparing the material of the present invention, comprising the steps of providing a suspension of nuclei of a microporous crystalline molecular sieve material in an aqueous media; mixing the suspension with a water soluble tensoactive organic compound to provide a mixture of the nuclei and micelles of the tensoactive organic compound in solution; inducing aggregation of the nuclei around the micelles so as to provide a solid material having the organic compound dispersed therein; and extracting the organic compound from the solid material to provide a crystalline molecular sieve material having a micropore volume greater than or equal to about 0.15 cc/g distributed in channels about 3 to about 15 Å in average diameter, and having a mesopore volume of at least about 0.1 cc/g distributed in channels about 20 Å to about 100 Å in average diameter.

The material according to the present invention is advantageous in that a catalyst is provided for use in conversion and transformation of heavy hydrocarbon and other feedstocks which include large organic molecules wherein mesopore-sized pore volumes are provided in the catalyst material so as to provide access for the large organic molecules to the interior sites of the catalyst material. Further advantageously, the catalyst and the process for preparing same in accordance with the present invention result in a narrow size distribution of the larger mesopores, thereby providing increased pore volume and improved access to interior portions of the catalyst material.

The material according to the present invention is also advantageous for use in purification of organic feedstocks, in which case one or more components from the feed are separated by being sorbed within the mesopores of the material of the present invention. These components can then be recovered by extracting them from the material of the present invention with a heat or solvent treatment. Alternatively, these components can be safely disposed, while sorbed within the material of the present invention.

BRIEF DESCRIPTION OF THE DRAWINGS

A detailed description of preferred embodiments of the invention follows, with reference to the attached drawings, wherein.

DETAILED DESCRIPTION

Figure 1:
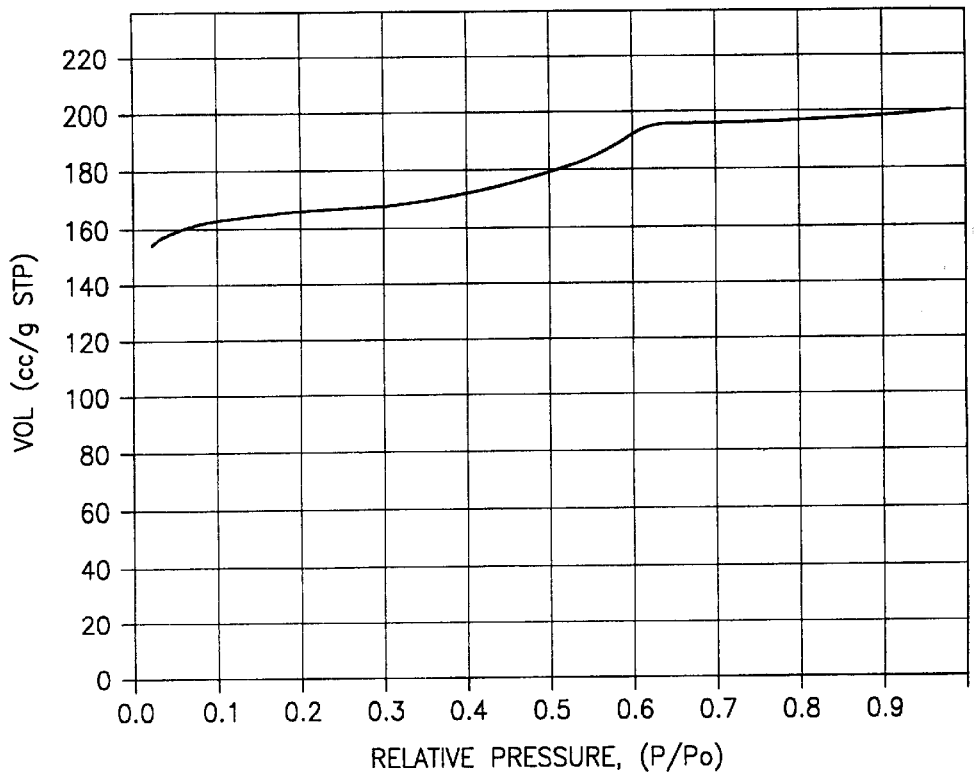
FIG. 1 is the $N_2$ desorption isotherm for the product of Example 1.

The invention relates to a material and process for preparing same wherein nuclei of a crystalline microporous molecular sieve material are aggregated such that a narrow size distribution of mesopore-sized pore volume is provided.

According to the invention, the material comprises a crystalline microporous molecular sieve material which also has a narrow size distribution of larger mesopore sized pore volume. The molecular sieve material of the present invention preferably includes a micropore-sized distribution having pore sizes between about 3 Å to about 15 Å, and the micropore-sized pore volume is preferably at least about 0.15 cc/g. The mesopore-sized pore volume preferably has a pore size distribution of between about 20 Å to about 100 Å, and the mesopore-sized pore volume is preferably at least about 0.1 cc/g.

The crystalline microporous walls in the material of the present invention are further characterized by an x-ray diffraction pattern which exhibits at least two lines at d-spacings of less than 15 Å, by the presence of an absorption band between 540 $cm^{-1}$ and 750 $cm^{-1}$ in an infrared spectrum and/or by an ion exchange capacity higher than 0.05 milliequivalents per gram of material on a dry basis.

The narrow mesopore size distribution in the material of the present invention is further characterized by a desorption isotherm having a sharp inflection point at partial pressures $P/P_0$ (nitrogen or argon) of between about 0.05 to about 0.8, where $P/P_0$ is a ratio of the pressure at which the sorbate gas desorbs (P) and the vapor pressure of the liquefied sorbate gas ($P_0$).

In accordance with the invention, the nuclei of the microporous crystalline molecular sieve material may suitably be selected from the group consisting of metalosilicate, zeolite, aluminophosphate, metaloaluminophosphate, silicoaluminophosphate, metalosilicoaluminophosphate and mixtures thereof. These materials are particularly desirable because of their microporous molecular sieve structure which provides particularly useful microporous crystalline walls with desirably active sites, which microporous crystalline walls are rendered accessible to larger sized organic molecules by a large volume of mesopore-sized channels which the material is provided with in accordance with the invention.

The material of the present invention is prepared by mixing a suspension of nuclei of the desired microporous crystalline molecular sieve material in an aqueous media with an organic compound having tensoactive properties selected to provide the desired mesopore size and size distribution as will be discussed further below. The mixture of suspension of nuclei and organic compound is then subjected to appropriate synthesis conditions so as to induce aggregation of the nuclei in the mixture. According to the invention, specific nuclei and organic compound are selected and mixed, so as to promote interaction and intimate contact between the nuclei and micelles of the organic compound. This results, advantageously, in the nuclei condensing around micelles of the organic compound resulting in the formation of a solid material having the crystalline molecular sieve material formed around the organic compound.

In further accordance with the process of the present invention, the solid material of crystalline molecular sieve material formed around organic compound is then further treated so as to extract the organic compound, for example by calcination or solvent extraction, thereby generating mesopore-sized void volume in the spaces formerly occupied by the organic compound. Advantageously, the organic compound can suitably be selected according to the invention so as to provide the mesopore void volume with a narrow size distribution of pores of between about 20 Å to about 100 Å.

Nuclei of the microporous crystalline molecular sieve material may suitably be selected from the group consisting of metalosilicate, zeolite, aluminophosphate metaloaluminophosphate, silicoaluminophosphate, and metalosilicoaluminophosphate, among others. Particularly preferable are such materials which synthesize to form a crystalline structure having the desired micropore-sized channels and active sites with the desired strength and density for the use of the material of the present invention as a catalyst or as a sorbent in a particular application.

The organic compound used to generate the mesopore-size pore volume is preferably selected, based upon the microporous crystalline molecular sieve material being used, so as to provide micelles of the organic compound in water which under synthesis conditions will interact and result in intimate contact with the microporous crystalline molecular sieve nuclei. Within this broad range of suitable materials, certain cationic surfactant such as quaternary ammonium salts, anionic surfactant such as alkylbenzesulfonates, alkyl sulfates, alkanesulfonates, hydroxyalkyl sulfonates, alpha-olefinsulfonate, alkyl ether sulfate, petroleum sulfonate, phosphate esters, soaps, or acylated amino acids, non-ionic surfactant such as ethoxylated alcohols, ethoxylated alkyl alkylphenols, ethoxylated acids, fatty acid alkanolamides, ethoxylated alkanolamides, ethoxylated amines, amine oxides, derivatives of saccharaides, or polyalcohols and amphoteric surfactant such as carboxybetaines, amino acids or lecithin are suitable.

As set forth above, it is desirable in accordance with the present invention to promote attractive interactions between the microporous crystalline nuclei and the organic compound in solution so that these materials are in intimate contact during nuclei aggregation. The desired interaction can be provided, for example, by either or both of electrostatic forces and van der Waal's forces. Numerous organic compounds or molecules may suitably be used to promote the desired interaction including but not limited to those set forth above.

It has been found in accordance with the present invention that certain combinations of nuclei and organic compound have enhanced attractive interaction at certain synthesis conditions, especially the solution pH at which nucleation is carried out. For example, when cationic surfactant are dissolved in an aqueous phase, they are partially to totally dissociated, giving rise to cationic organic species that preferentially interact with a suspension of inorganic negatively charged material such as, for example, metalosilicate or zeolite nuclei at a pH higher than 6. As another example, anionic surfactant give rise to organic anions in solution which preferentially interact with a suspension of inorganic nuclei positively charged, such as, for example, aluminophosphates metaloaluminophosphates, silicoaluminophosphates and/or metalosilicoaluminophosphate at pH lower than 7.

Other factors which influence the desired attractive interaction between the nuclei and organic compound in solution are solution temperatures lower than 100° C., and/or inorganic salts that intercalate between the organic tensoactive ion and the inorganic nuclei, when they have the same charge in solution. In accordance with a preferred embodiment of the invention, nuclei of a microporous metalosilicate are provided by preparing them according to the prior art from inorganic salts and/or colloidal precursors. More preferably, nuclei of the zeolite faujasite are provided and they are preferably mixed with a basic solution (having a pH greater than 7) containing 1 or more cationic and/or non-ionic surfactant. According to the invention, this mixture is then preferably aged at temperatures of between 20° C. to about 100° C. for at least one hour to promote the aggregation of the zeolite nuclei around the micelles of the tensoactive organic compound.

In accordance with the invention, the resulting solid is then washed in water and dried, and the tensoactive organic compound is then extracted preferably by calcination in air so as to provide the solidified crystalline microporous faujasite with a mesopore-sized pore volume having the desired narrow pore-sized distribution. The material so prepared in accordance with the invention is particularly useful as a catalyst or a sorbent because the zeolitic sites are accessible through the larger mesopore pore volume, and sites are provided which may be tailored, for example, through the use of other metals and the like, to provide a desired activity.

A further alternative embodiment of the process of the present invention involves synthesis of the material using metalophosphates, especially aluminophosphate or silicoaluminophosphate nuclei.

In accordance with this process, the desired nuclei are mixed in a solution preferably having neutral or acid pH, preferably a pH less than or equal to 5 with one or more anionic and/or non-ionic surfactant. This mixture is then aged at temperatures of between about 20° C. to about 100° C. for at least one hour to promote aggregation of the metalophosphate nuclei around the surfactant micelles. As with the above process, the resulting solid is then washed in water and dried, and the organic compound is then extracted from the solid so as to provide the desired mesopore-sized pore volume.

The material of the present invention comprises a crystalline material having at least one microporous crystalline phase. However, in accordance to the process of the present invention, it has been found that if nucleii of a dense phase are aggregated around the micelles of the tensoactive organic compound, a material with a narrow distribution of mesopores, a mesopore volume of greater than or equal to 0.1 cc/g, but without micropores, is formed, as demonstrated in example 4.

It should be appreciated that the amount of mesopore-sized pore volume provided according to the invention depends upon the amount of surfactant included in the nuclei/organic compound solution. Further, the size of the mesopore-sized pores depends upon the length of the hydrophobic tail of the surfactant, with a longer tail providing a larger mesopore pore size. Thus, the amount and size of mesopore-sized pore volume can be selectively controlled by selecting the proper amount and size of organic compound.

The amount and size of the mesopore-sized pore volume can also be selectively controlled by adding organic water-insoluble compounds to the mixture of the inorganic nuclei and the tensoactive organic compound. These water-insoluble compounds combine with the hydrophobic tail of the surfactant, and increase the size of the micelle around which the inorganic nuclei aggregate, thus increasing the size and volume of the resulting mesopore-sized channels in the material of the present invention.

As in the case of many catalysts, it may be advantageous to combine the material of the present invention with a matrix material that has desirable thermal and mechanical properties, among others. The material of the present invention may also be combined with other materials, used as diluents to control the amount of conversion in a given process. Examples of such materials are aluminas, silicas, silica-aluminas, magnesias, titanias, zirconias, carbons and their precursors, clays and mixtures thereof. Also, precursors to the above mentioned materials can be used, such as colloidal silica, alumina sols, suspensions of pseudobohemite, titania, or zirconia, and/or hydrosols of any of above mentioned oxides, among others. These materials may be combined with the material of the present invention during preparation or in a post-synthesis process. Also, these materials may be provided in part in colloidal form so as to facilitate extrusion of the bound components.

In order to confer desirable thermal and/or mechanical properties to the material of the present invention, it may also be advantageous to incorporate a binder material when inducing the aggregation of the inorganic microporous crystalline nuclei around the micelles of the tensoactive organic compound. Examples of such binder materials are colloidal silica, alumina, silica-alumina, magnesia, titania, zirconia and mixtures thereof.

The nuclei used in the preparation of the material of the present invention may be prepared according to the prior art, starting from inorganic salts, or by dissolving gels or powders of the desirable microporous crystalline molecular sieve material in either acid or basic solutions. When prepared from inorganic salts, the latter are dissolved in either basic, acidic, or neutral solutions, and treated at temperatures of between about 5° C. to about 200° C., for times of between about 10 minutes to about 120 hours, and with or without the further addition of structure directing or template agents such as, for example, mono, di, tri and tetra-alkyl amines, crown ethers and mixtures thereof.

The material of the present invention is useful as a catalyst for conversion of organic compounds, especially large hydrocarbons with molecular sizes of about 15 Å or more. It is particularly useful for catalyzing reactions that occur in the presence of acidic sites, in which the large hydrocarbon molecule is converted into products of lower molecular weight or into more valuable isomers. Examples of such reactions are involved in processes such as cracking, hydrocracking and isomerization. In such processes the material of the present invention presents various advantages over conventional catalysts. The strength of the acidic site can be conveniently adjusted, by selecting a convenient kind of nuclei, during preparation of the material of the present invention. If strong acid sites are advantageous, then nuclei of zeolites such as, for example, X, Y, L, mordenite, beta, MFI-type or MTW-type can be used. If weaker acid sites are preferred for a particular application, then nuclei of silicoaluminophosphates or metaloaluminophosphates could be used. Because the material of the present invention has well structured crystalline walls, the distribution of active sites throughout the mesoporous channels is uniform, and can be controlled by adjusting the composition of the microporous crystalline nuclei during preparation of the material of the present invention. The activation of acidic sites in the material of the present invention may require the substitution of alkali metals by protons, either through direct ion-exchange with an acid solution or by ion exchange with an ammonium salt solution, followed by heat treatment to evolve ammonia.

Another advantage of the material of the present invention is that the large mesopore size and volume allow large hydrocarbon molecules to easily access the catalytically active sites located on the crystalline microporous walls, thereby minimizing diffusional constraints. The improved diffusion through channels also allows the primary products from the transformation and or conversion of the large hydrocarbon molecule to exit the material before secondary reactions can take place, thereby retarding or even avoiding the formation of undesirable secondary products such as coke which could eventually plug the channels or deactivate the catalytic sites on the crystalline walls of the material.

It may also be advantageous to incorporate into the material of the present invention minor amounts of metals as catalytic components, especially noble metals such as platinum, rhodium, rhenium, iridium, or Group VIII metals such as nickel, iron and/or cobalt, or Group VI metals such as chromium, molybdenum and/or tungsten. These metals may be present in their metallic state, or as oxides, sulfides or mixtures thereof. These metals could provide the material of the present invention desired catalytic properties for processes such as hydrotreatment, hydroisomerization, hydrocracking, hydrogenation and/or reforming, to convert large hydrocarbon molecules into more valuable products.

The material of the present invention may also be advantageously used as a sorbent for the selective separation of one or more components in a feed. The narrow pore size distribution of mesopores and the large pore volume allow for the separation of components in the feed by size exclusion of molecules. Also, the microporous crystalline walls of the material of the present invention provide for sites that can be modified with the incorporation of molecules that contain specific functional groups with affinity toward specific components in the mixture, allowing their separation from the feed. Examples include the incorporation of amines to preferentially adsorb acidic components in a feed, or chelating agents that separate metal contaminations off a stream. Also, these sites on the microporous crystalline walls of the material of the present invention can be used to incorporate compounds that can control the hydrophilicity of the environment within the pores, advantageously allowing the separation of polar from non-polar components in a feed.

The material of the present invention may also be advantageously used for recuperation or abatement of metal cations in water, since its microporous crystalline walls provide for a high density of ion-exchange sites, and its mesoporous channels avoid diffusional problems associated with accessing these sites in conventional materials.

Although the material of the present invention is useful in the treatment of any hydrocarbon molecule, it is particularly advantageous when used for the treatment of large molecules that are too big to fit into the channels of more conventional catalysts and/or sorbents. The material of the present invention is especially suited for the treatment of high boiling point hydrocarbon fractions in crude oils such as atmospheric and vacuum gas oils, high boiling point products from processes such catalytic cracking, thermal cracking, lube production and the like and non-distillable fractions from crude oil or from conversion processes such as residual feeds. The material of the present invention could also be utilized with feeds of non-petroleum origin.

The following examples further illustrate the catalyst material and process of the present invention.

EXAMPLE 1

This example demonstrates the preparation of a material using faujasite X in accordance with the invention.

Initially, a suspension of faujasite X nuclei in water was prepared as follows. A suspension (Suspension A) was formed by vigorously stirring a mixture of 20.5 g of sodium silicate (29% wt $SiO_2$; 9.3% wt $Na_2O$; 61.7% wt $H_2O$) and 6.8 mL of a 13.4 M NaOH solution. A solution (Solution B) was prepared by dissolving 1.38 g of sodium aluminate (49.1% wt $Al_2O_3$; 27.2% $Na_2O$, 23.7% $H_2O$) into 8.2 mL of a 5.9 M solution of NaOH. Suspension A was added over Solution B, while stirring the latter. After the addition was complete, stirring was continued for one more hour, resulting in a clear suspension of faujasite X nuclei having the following composition:

1 $SiO_2$:0.066 $Al_2O_3$:1.06 $Na_2O$:15.1 $H_2O$

This suspension was aged at room temperature for 2.7 hours, after which a solution of 7.98 g of cetyltrimethylammonium bromide (CTAB) in 10 g of water was added, resulting in a suspension having the following composition:

1 $SiO_2$:0.066 $Al_2O_3$:1.06 $Na_2O$:0.22 CTAB:21 $H_2O$

This suspension was aged for 24 hours at a temperature of 80° C., and the resulting solid was washed, dried at 100° C. for 4 hours, and then calcined at 500° C. for 6 hours in a flow of air.

The calcined product shows an x-ray diffraction pattern having the main strong signals as set forth below in Table 1:

TABLE 1

| d-spacing (Å) | Relative intensity (%) |
|---|---|
| 14.5 | 100 |
| 8.9 | 18 |
| 7.6 | 14 |
| 5.8 | 38 |
| 4.8 | 17 |
| 4.4 | 25 |
| 4.0 | 14 |
| 3.8 | 71 |
| 3.6 | 9 |
| 3.3 | 65 |
| 3.1 | 19 |
| 3.0 | 18 |
| 2.9 | 45 |
| 2.8 | 16 |
| 2.8 | 11 |
| 2.7 | 14 |
| 2.6 | 5 |
| 2.4 | 9 |

Other minor signals at d-spacings of less than 15 Å (relative intensity of less than 5%) were also present. This diffraction can be assigned to that of faujasite X.

The pore volume of the micropore volume of the calcined material was determined from equilibrium $N_2$ adsorption capacity at different $N_2$ partial pressures, according to ASTM standard method D 4365-85. The calcined material had a micropore pore volume of 0.25 cc/g.

Figure 2:
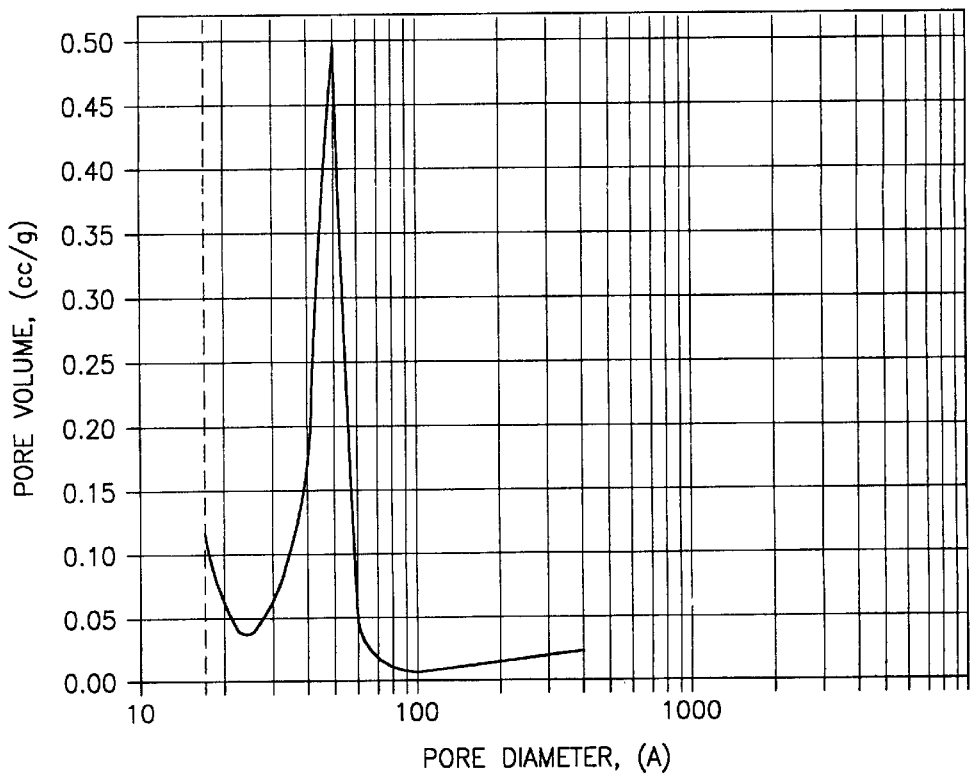
FIG. 2 is a derivative of the $N_2$ desorption volume as a function of pore diameter for the product of Example 1, showing its size distribution of mesopores.

The mesopore size distribution of the calcined material was determined from equilibrium $N_2$ desorption isotherm, according to ASTM standard method D 4641-93. FIG. 1 shows the $N_2$ desorption isotherm for the calcined material. As shown, the desorption isotherm has an inflection point at $P/P_0$ equal to 0.55, which corresponds to the filling of a pore system of 50 Å in average diameter. The sharp drop in the isotherm around this inflection point indicates a narrow pore size distribution. FIG. 2 is a plot of the derivative of the $N_2$ desorption volume as a function of pore diameter, which further illustrates the narrow pore size distribution for the mesopores of between about 40 Å to about 60 Å.

The mesopore pore volume was determined according to ASTM standard method D 4641-93, and was found to be 0.12 cc/g.

EXAMPLE 2

This example illustrates the preparation of another material according to the present invention using faujasite X nuclei. A suspension of faujasite X nuclei was prepared as follows.

A suspension (Suspension A) was prepared by vigorously stirring a mixture of 20.5 g of sodium silicate (29% wt $SiO_2$; 9.3% wt $Na_2O$; 61.7% wt $H_2O$) and 6.8 mL of a 13.4 M NaOH solution. A solution (Solution B) was prepared by dissolving 1.38 g of sodium aluminate (49.1% wt $Al_2O_3$; 27.2% $Na_2O$, 23.7% $H_2O$) into 8.2 mL of a 5.9 M solution of NaOH. Suspension A was added over Solution B, while stirring the latter. After the addition was complete, stirring was continued for one more hour, resulting in a clear suspension of faujasite X nuclei having the following composition:

1 $SiO_2$:0.066 $Al_2O_3$:1.06 $Na_2O$:15.1 $H_2O$

This is suspension was aged at room temperature for 24 hours, after which a solution of 7.98 g of cetyltrimethylammonium bromide (CTAB) in 10 g of water was added, resulting in a suspension having the following composition:

1 $SiO_2$:0.066 $Al_2O_3$:1.06 $Na_2O$:0.22 CTAB:21 $H_2O$

This suspension was aged for 24 hours at a temperature of 80° C., and the resulting solid was washed, dried at 100° C. for 4 hours, and then calcined at 500° C. for 6 hours in a flow of air.

The calcined product shows an x-ray diffraction pattern having the main strong signals as set forth below in Table 2:

TABLE 2

| d-spacing (Å) | Relative intensity (%) |
|---|---|
| 14.5 | 100 |
| 8.9 | 21 |
| 7.6 | 13 |
| 5.8 | 32 |
| 4.8 | 16 |
| 4.4 | 20 |
| 4.0 | 12 |
| 3.8 | 69 |
| 3.6 | 7 |
| 3.3 | 66 |
| 3.1 | 16 |
| 3.0 | 17 |
| 2.9 | 49 |
| 2.8 | 19 |
| 2.8 | 12 |
| 2.7 | 15 |
| 2.4 | 6 |

Other minor signals at d-spacings of less than 15 Å (relative intensity of less than 5%) were also present. As with the diffraction of Example 1, this diffraction is characteristic of faujasite X.

The pore volume of the micropore volume of the calcined material was determined as in Example 1. The calcined material had a micropore pore volume of 0.21 cc/g.

Figure 3:
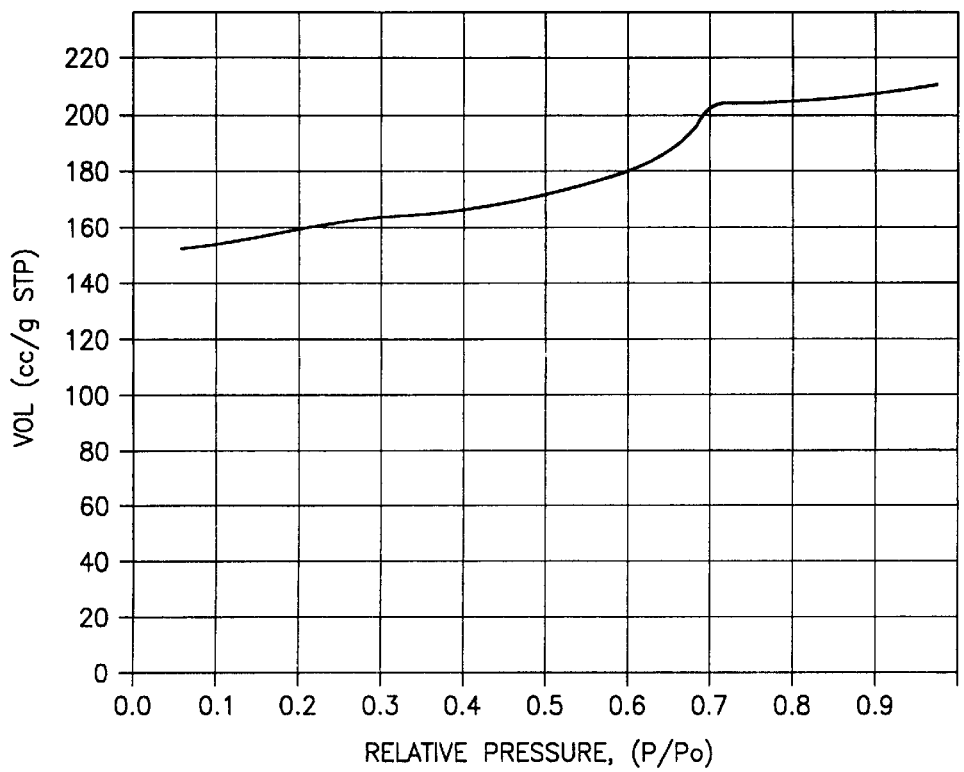
FIG. 3 is the $N_2$ desorption isotherm for the product of Example 2.
Figure 4:
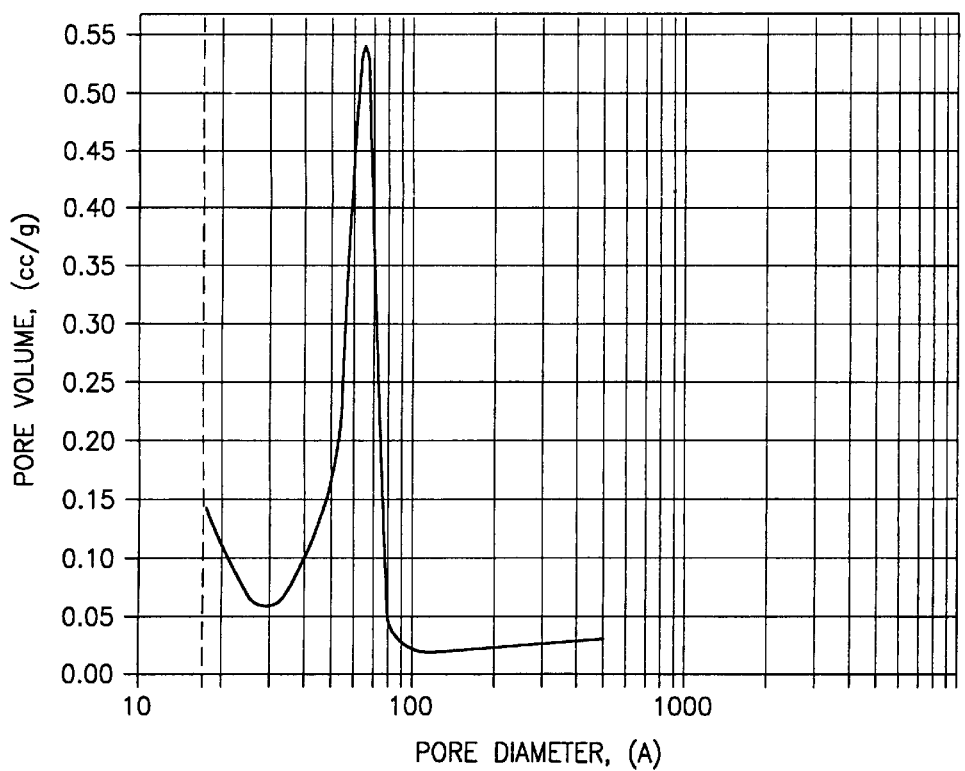
FIG. 4 is a derivative of the $N_2$ desorption volume as a function of pore diameter for the product of Example 2, showing its size distribution of mesopores.

The mesopore size distribution of the calcined material was determined from equilibrium $N_2$ desorption isotherm as set forth in Example 1. FIG. 3 shows the $N_2$ desorption isotherm for the calcined material. As shown, the desorption isotherm has an inflection point at $P/P_0$ equal to 0.65, which corresponds to the filling of a pore system of 65 Å in average diameter. The sharp drop in the isotherm around this inflection point indicates a narrow pore size distribution. FIG. 4 is a plot of the derivative of the $N_2$ desorption volume as a function of pore diameter, which further illustrates the narrow pore size distribution for the mesopores of between about 50 Å to about 70 Å.

The mesopore pore volume was determined according to ASTM standard method D 4641-93 as in Example 1, and was found to be 0.15 cc/g.

EXAMPLE 3

This example demonstrates the narrow pore size distribution in the mesopores formed in material according to the invention compared to material treated conventionally to obtain larger pore sizes.

Figure 5:
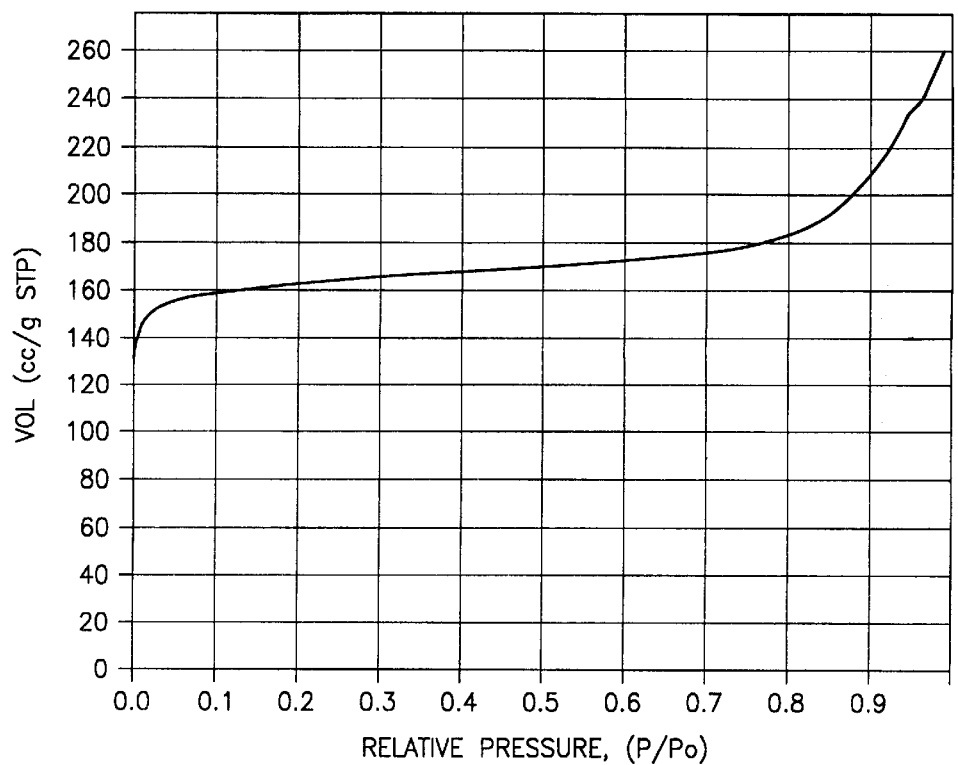
FIG. 5 is the $N_2$ desorption isotherm for a commercial steam dealuminated zeolite Y.
Figure 6:
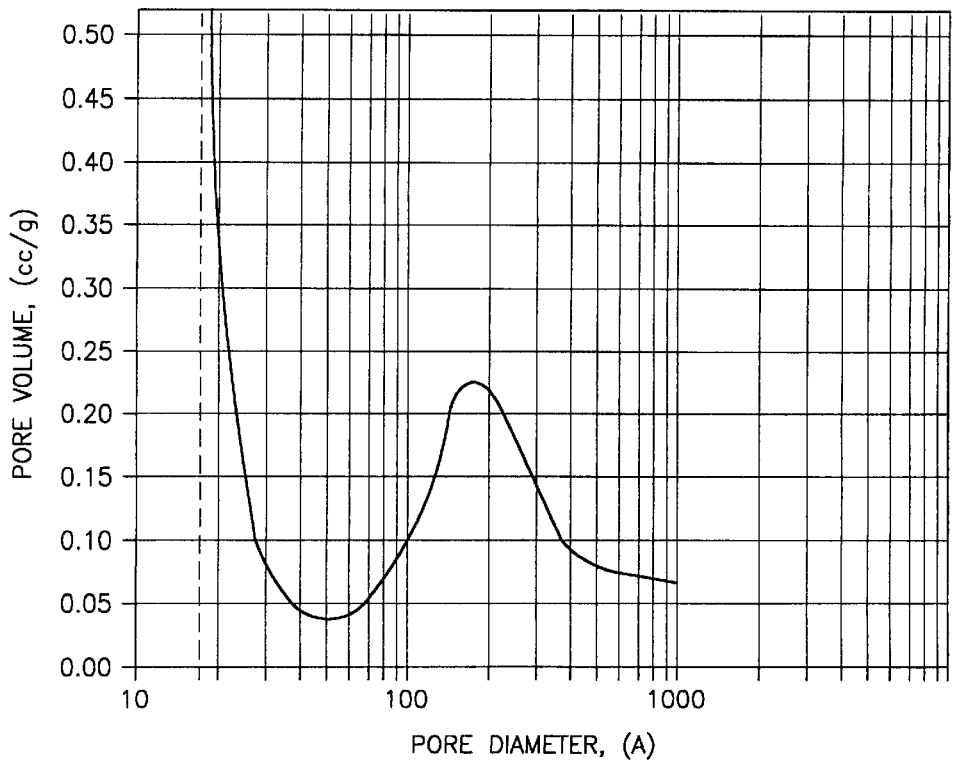
FIG. 6 is a derivative of the $N_2$ desorption volume as a function of pore diameter for a commercial steam dealuminated zeolite Y, showing its size distribution of meso and macropores.

The $N_2$ desorption isotherm of a commercial steam dealuminated zeolite Y was determined according to ASTM standard method D 4222-91, with the desorption isotherm being plotted as set forth in FIG. 5, with the derivative of $N_2$ desorption volume being plotted versus pore diameter for the commercial sample in FIG. 6.

Comparing FIGS. 1, 3 and 5, it is apparent that the material prepared according to the present invention illustrates sharp inflection points in the isotherm between relative pressures of 0.05 and 0.8, while the commercial sample shows a gradual increase over the same range. This difference indicates that the material of the present invention has a narrow distribution of pore diameters in the 15 to 100 Å range, while the commercial material has pore diameters with a wide distribution of sizes falling mainly in the 100 to 2000 Å range.

It should be readily apparent that a material and process for preparing same have been provided which advantageously result in a microporous molecular sieve material which also has a narrow pore size distribution of mesoporous pore volume as desired. The catalyst material of the present invention is particularly useful in treating feedstocks having large organic molecules, and exhibits shape selectivity which advantageously provides enhanced conversion, transformation or purification of the feedstock to be treated.

EXAMPLE 4

This example demonstrates the preparation of a material with a narrow distribution of mesopores using dense nuclei of an aluminophosphate in accordance with the process of the present invention.

Initially, a suspension of dense aluminophosphate nuclei in water was prepared as follows. A suspension (Suspension A) was formed by vigorously stirring a mixture of 3.52 g of aluminum hydroxide [Al(OH)$_3$] and 50 mL of concentrated hydrochloric acid (HCl, 37% wt). A solution (Solution B) was prepared by dissolving 4.02 g of disodium hydrogen phosphate-7-hydrate, (Na$_2$HPO$_4$—7H$_2$O, 99.9% wt) into 48.5 mL of concentrated hydrochloric acid (HCl, 37% wt). Another solution (Solution C) was prepared by dissolving 5.28 g of para-nonyl phenol ethoxylated with fifteen moles of ethylene oxide per mole of alkylphenol (C9H19—Ph—O—(CH2—CH2—O)14—CH2—CH2—OH, where Ph is phenyl group) in 298 g of water. Suspension A and Solution B were added over Solution C, while stirring the latter. After the addition was complete, stirring was continue for 15 more minutes, resulting in a suspension of variscite nuclei having the following composition:

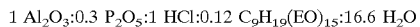

1 Al$_2$O$_3$:0.3 P$_2$O$_5$:1 HCl:0.12 C$_9$H$_{19}$(EO)$_{15}$:16.6 H$_2$O

This suspension was aged at room temperature for 3 days, after which 150 mL of NaOH (8 N) were added, resulting in a suspension having the following composition:

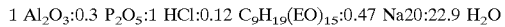

1 Al$_2$O$_3$:0.3 P$_2$O$_5$:1 HCl:0.12 C$_9$H$_{19}$(EO)$_{15}$:0.47 Na20:22.9 H$_2$O

This suspension was aged for 3 days at a temperature of 60° C., and the resulting solid was washed, dried at 100° C. for 4 hours, and then calcined at 500° C. for 6 hours in a flow of air.

Figure 7:
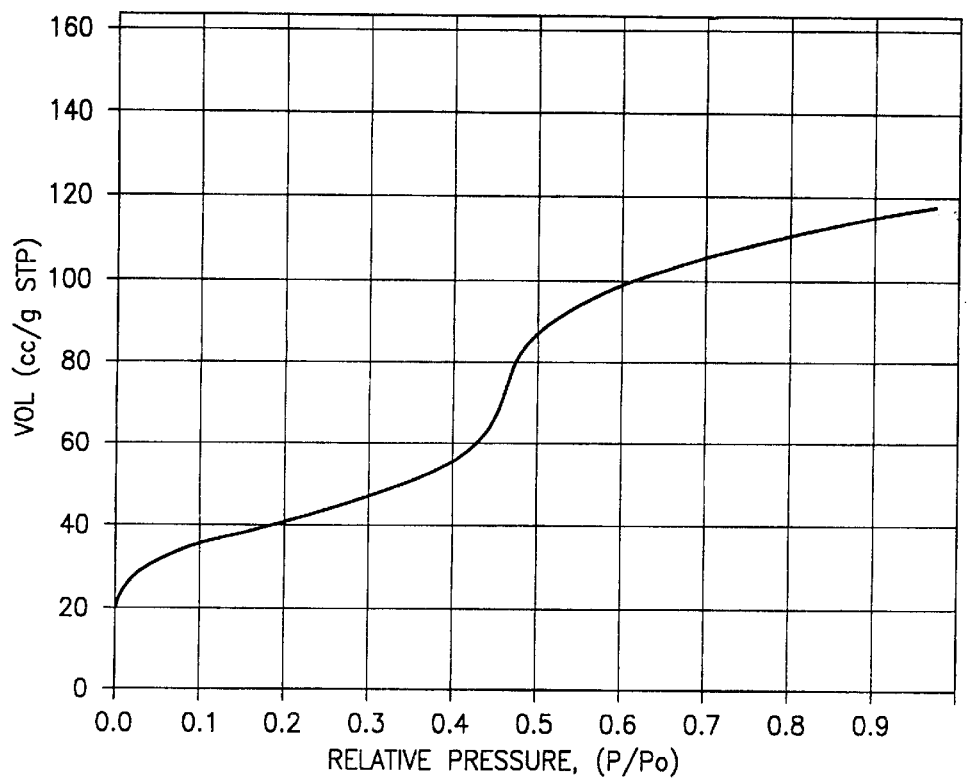
FIG. 7 is the $N_2$ description isotherm for the product of Example 4.
Figure 8:
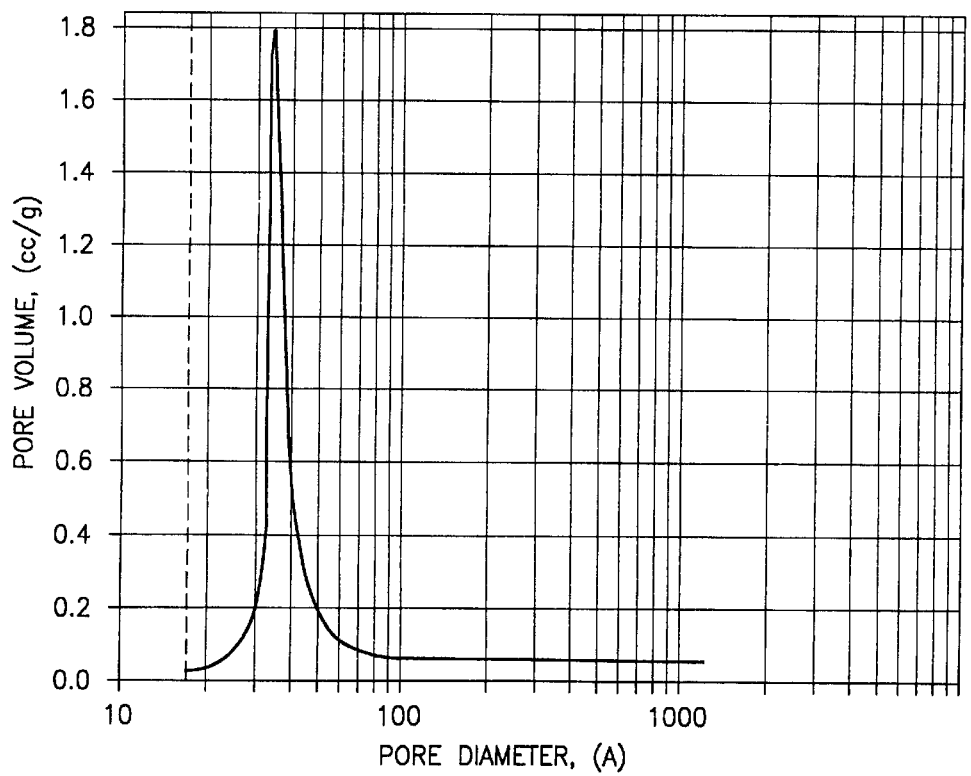
FIG. 8 is a derivative of the $N_2$ description volume as a function of pore diameter for the product of Example 4, showing its size distribution of mesopores.

The mesopore size distribution of the calcined material was determined from equilibrium N$_2$ desorption isotherm, according to ASTM Standard Practice D 4641-93. FIG. 7 shows the N$_2$ desorption isotherm for the calcined material. As shown, the desorption isotherm has an inflection point at P/P$_0$ equal to 0.45, which corresponds to the filling of a pore system of 35 Å in average diameter. The sharp drop in the isotherm around this inflection point indicates a narrow pore size distribution. FIG. 8 is a plot of the derivative of the N$_2$ desorption volume as a function of pore diameter, which further illustrates the narrow pore size distribution for the mesopores of 35 Å.

The mesopore pore volume was determined according to ASTM Standard Method D 4641-93, and was found to be 0.24 cc/g.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for preparing a crystalline molecular sieve material selected from the group consisting of zeolite, metalosilicate, aluminophosphate, metaloaluminophosphate, silicoaluminophosphate, metalosilicoaluminophosphate and mixtures thereof, comprising the steps of:

providing a suspension of nuclei of a crystalline molecular sieve material in an aqueous media;

mixing the suspension with a water soluble organic compound to provide a mixture of the nuclei and micelles of the organic compound in solution;

inducing the nuclei around the micelles of the organic compound so as to produce a solid material having the organic compound dispersed therein;

extracting the organic compound from the solid material to provide a crystalline molecular sieve material having a micropore volume greater than or equal to about 0.15 cc/g distributed in channels about 3 to about 15 Å in average diameter, and having a mesopore volume of at least about 0.1 cc/g distributed in channels about 20 Å to about 100 Å in average diameter.

2. A process according to claim 1, wherein the organic compound is selected from the group consisting of cationic surfactant, anionic surfactant, non-ionic surfactant, amphoteric surfactant and mixtures thereof.

3. A process according to claim 2, wherein the organic compound is selected from the group consisting of quaternary ammonium salt, ethoxylated alcohol, ethoxylated alkyl alkylphenol, ethoxylated acid, fatty acid alkanolamides, ethoxylated alkanolamides, ethoxylated amine, amine oxide, derivative of saccharaide, polyalcohol, alkylbenzesulfonate, alkyl sulfate, alkanesulfonate, hydroxyalkyl sulfonate, alpha-olefinsulfonate, alkyl ether sulfate, petroleum sulfonate, phosphate ester, soap, acylated amino acid, carboxybetaine, amino-acid, lecithin and mixtures thereof.

4. A process according to claim 1, wherein the inducing step is carried out at a temperature of between about 20° C. to about 100° C. for a period of time of at least about 10 minutes.

5. A process according to claim 1, wherein the concentration of the organic compound is higher than the critical micellar concentration and lower than a liquid crystal concentration.

6. A process according to claim 1, wherein the nuclei of microporous crystalline molecular sieve material are selected from the group consisting of nuclei of zeolite, metalosilicate and mixtures thereof, wherein the organic compound is a cationic surfactant, and wherein the mixture of the nuclei and the organic compound in solution has a pH greater than or equal to about 7, and wherein the inducing aggregation step is carried out at a temperature of between about 20° C. to about 100° C. for a period of time of at least about 10 minutes.

7. A process according to claim 6, wherein the nuclei of microporous crystalline molecular sieve material comprises faujasite zeolite nuclei.

8. A process according to claim 1, wherein the nuclei of microporous crystalline molecular sieve material are selected from the group consisting of nuclei of aluminophosphate, metaloaluminophosphate, silicoaluminophosphate, metalosilicoaluminophosphate and mixtures thereof, wherein the organic compound is an anionic surfactant, and wherein the mixture of the nuclei and the organic compound in solution has a pH less than or equal to about 5, and wherein the inducing aggregation step is carried out at a temperature of between about 20° C. to about 100° C. for a period of time of at least about 10 minutes.

9. A process according to claim 1, wherein the step of inducing is carried out in the presence of a binder.

10. A process according to claim 9, wherein the binder is selected from the group consisting of colloidal suspensions of silica, alumina, silica-alumina, magnesia, zirconia, titania and mixtures thereof.

11. A process according to claim 1, further comprising the step of selecting the nuclei, the organic compound and synthesis conditions so as to promote interaction between the nuclei and the organic compound, whereby the inducing step results in aggregation of the nuclei around micelles of the organic compound.

* * * * *